United States Patent
Weyerhaeuser et al.

(10) Patent No.: US 11,023,468 B2
(45) Date of Patent: Jun. 1, 2021

(54) FIRST/LAST AGGREGATION OPERATOR ON MULTIPLE KEYFIGURES WITH A SINGLE TABLE SCAN

(71) Applicant: SAP SE, Walldorf (DE)

(72) Inventors: Christoph Weyerhaeuser, Heidelberg (DE); Tobias Mindnich, Sulzbach (DE); Johannes Merx, Heidelberg (DE); Julian Schwing, Mannheim (DE)

(73) Assignee: SAP SE, Walldorf (DE)

( * ) Notice: Subject to any disclaimer, the term of this patent is extended or adjusted under 35 U.S.C. 154(b) by 494 days.

(21) Appl. No.: 14/947,627

(22) Filed: Nov. 20, 2015

(65) Prior Publication Data

US 2017/0147636 A1 May 25, 2017

(51) Int. Cl.
*G06F 16/24* (2019.01)
*G06F 16/2455* (2019.01)

(52) U.S. Cl.
CPC .............................. *G06F 16/24554* (2019.01)

(58) Field of Classification Search
CPC ......... G06F 17/30463; G06F 17/30339; G06F 17/30469; G06F 17/30466; G06F 17/30442; G06F 17/30498; G06F 17/3033; G06F 17/30412; G06F 16/24542; G06F 16/2453; G06F 16/244
See application file for complete search history.

(56) References Cited

U.S. PATENT DOCUMENTS

| | | | | |
|---|---|---|---|---|
| 6,775,682 B1* | 8/2004 | Ballamkonda | .... | G06F 17/30489 |
| 7,035,843 B1* | 4/2006 | Bellamkonda | .... | G06F 17/30489 |
| 2005/0076029 A1* | 4/2005 | Ben-Zvi | ............ | G06F 16/24549 |
| 2013/0013824 A1* | 1/2013 | Graefe | ............. | G06F 16/24552 710/52 |
| 2013/0290298 A1* | 10/2013 | Weyerhaeuser | .. | G06F 16/24542 707/719 |
| 2014/0052726 A1* | 2/2014 | Amberg | ................ | G06F 16/244 707/737 |
| 2014/0156636 A1* | 6/2014 | Bellamkonda | .... | G06F 17/30489 707/718 |

(Continued)

*Primary Examiner* — Apu M Mofiz
*Assistant Examiner* — Cindy Nguyen
(74) *Attorney, Agent, or Firm* — Mintz Levin Cohn Ferris Glovsky and Popeo, P.C.

(57) ABSTRACT

Methods and apparatus, including computer program products, are provided for first and last aggregation. In one aspect, there is provided a method, which may include receiving, by a calculation engine, a query; detecting, by the calculation engine, whether the query includes a first aggregation and/or a last aggregation over at least one group and at least one keyfigure; optimizing the received query, when the detecting indicates the received query includes the first aggregation and/or the last aggregation, wherein the optimizing further comprises initiating execution of the received query by at least: performing a single read of a table, detecting, from the single table read, at least one group, and indicating, in the detected at least one group, the first aggregation in the at least one keyfigure and/or the last aggregation in the at least one keyfigure; and returning, for the at least one detected group, the indicated first aggregation and/or the indicated second aggregation. Related apparatus, systems, methods, and articles are also described.

9 Claims, 3 Drawing Sheets

(56) References Cited

U.S. PATENT DOCUMENTS

2014/0372368 A1* 12/2014 Schroetel .......... G06F 17/30592
707/603
2016/0378827 A1* 12/2016 Bondalapati ...... G06F 16/24556
707/718

* cited by examiner

FIRST/LAST AGGREGATION OPERATOR ON MULTIPLE KEYFIGURES WITH A SINGLE TABLE SCAN

FIELD

The present disclosure generally relates to data processing and, in particular, databases.

BACKGROUND

Database queries have become increasingly complex. Often, a query or other operation on a database requires a sequence of operations. As a consequence, some developers use tools to model the operations, and the models may describe the sequence using elements such as calculation nodes. These calculation nodes can represent an operation, such as a projection, an aggregation, a join, a union, a minus, an intersection, and the like. To enable reuse and flexibility, developers often use a calculation scenario that describes the sequence in a general way, such as in the form of a data flow consisting of calculation nodes. In some instances, tools may be used to optimize the calculation scenario prior to execution on the underlying database.

SUMMARY

Methods and apparatus, including computer program products, are provided for first and last aggregation.

In one aspect, there is provided a method, which may include receiving, by a calculation engine, a query; detecting, by the calculation engine, whether the query includes a first aggregation and/or a last aggregation over at least one group and at least one keyfigure; optimizing the received query, when the detecting indicates the received query includes the first aggregation and/or the last aggregation and further includes the at least one group and the at least one keyfigure, wherein the optimizing further comprises initiating execution of the received query by at least: performing a single read of a table, detecting, from the single table read, at least one group, and indicating, in the detected at least one group, the first aggregation in the at least one keyfigure and/or the last aggregation in the at least one keyfigure; and returning, for the at least one detected group, the indicated first aggregation and/or the indicated second aggregation.

In some implementations, the above-noted aspects may further include additional features described herein including one or more of the following. The keyfigure represents a numerical value, and wherein the at least one group is defined by at least one group by command. The detecting may further include replacing group by attribute values by a hash determined for each of the group by attribute values. The detecting may further include detecting, from the single table read, the at least one group based on the hash value. The detecting may further include detecting, from the single table read, the at least one group, when a hash value in a row differs from another hash value in a prior row. The detecting may further include indicating, from the single table read, the at least one group, when a hash value in a row differs from another hash value in a prior row. The first aggregation may represent a first aggregation command, and the last aggregation may represent a last aggregation command. The query may include a plurality of first aggregations and a plurality of last aggregations over a plurality of groups and a plurality keyfigures. The optimizing may be part of a query optimization.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
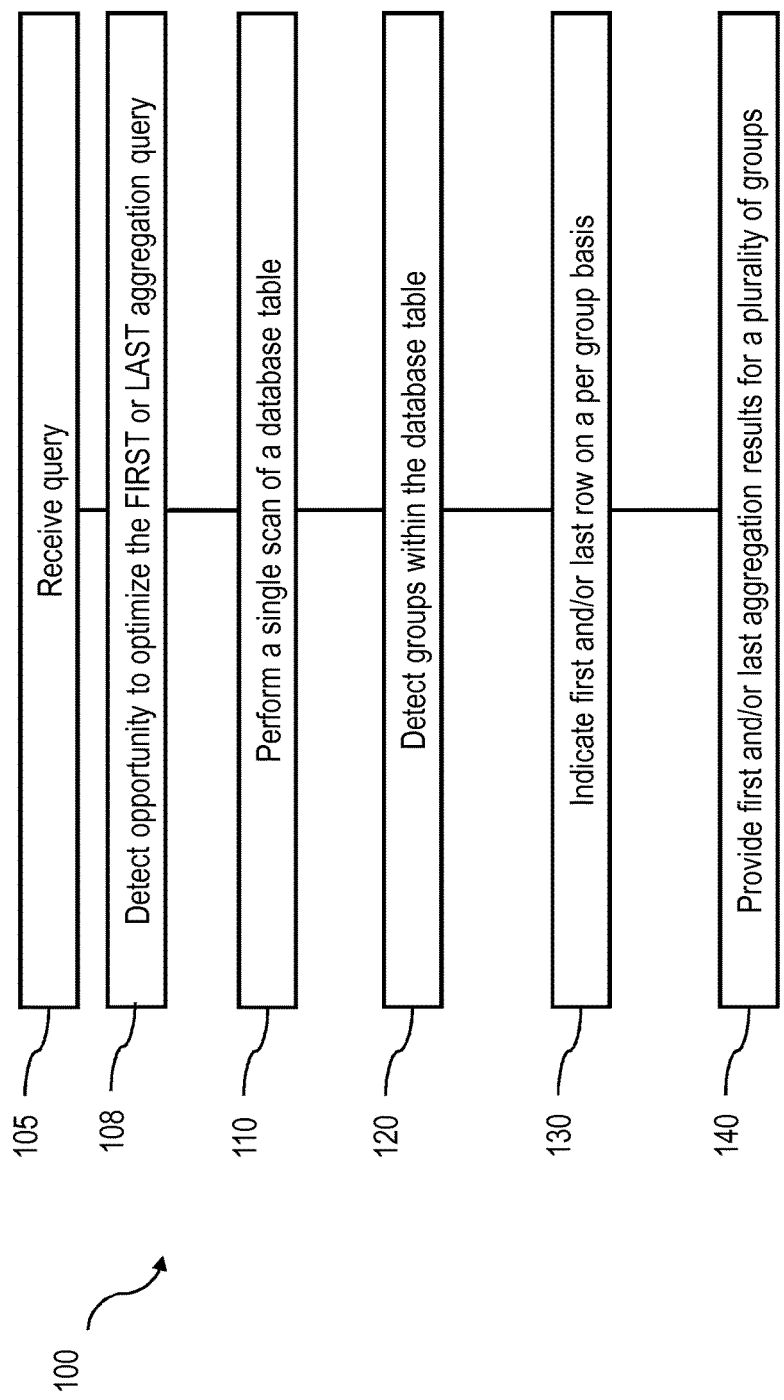
FIG. 1 depicts an example of a process for performing a FIRST or LAST aggregation using a single table scan.

Like labels are used to refer to same or similar items in the drawings.

DETAILED DESCRIPTION

A calculation scenario may represent a model, and this model may represent a sequence of steps to be performed in a database, such as an in-memory database. Specifically, the calculation scenario may model a complex query and/or other operations to be performed at the in-memory database. Often, the calculation scenarios are modeled in a somewhat general way to enable reuse and flexibility. This flexibility may, however, result in a calculation scenario that exposes more data attributes than is actually needed in some instances. This generalization may thus cause an increased size in the set of attributes and the corresponding calculation scenario, which makes parsing, persisting, and/or optimizing of the calculation scenarios more processor, memory, and/or power intensive. This increase in size may also cause an increase in the quantity of calculation nodes (such as operations) in a given calculation scenario, so more threads may need to be executed which compete for available CPU cores.

The following describes an example calculation scenario. A retailer's inventory reporting may include tracking product as inventory enters or leaves a warehouse. The transactions associated with the goods entering or leaving a warehouse may be booked in a database several times a day with corresponding time stamps indicating date and time, for example. Table 1 below provides an example of these transactions logged to a table of the database, such as an in-memory database.

TABLE 1

| Date | Time | Product | Amount |
|---|---|---|---|
| Aug. 8, 2014 | 08:15 | Milk | 100 |
| Aug. 8, 2014 | 08:30 | Water | 200 |
| Aug. 8, 2014 | 09:00 | Milk | 200 |
| Aug. 8, 2014 | 11:00 | Milk | 250 |
| Aug. 8, 2014 | 11:15 | Water | 100 |

On 2014-08-08 at 08:15, the retailer of Table 1 had 100 units of milk in the warehouse. Later that day at 09:00, 100 additional units of milk arrived, so the total amount of milk at that point is 200 units. Then again, later in the day, another 50 units of milk are delivered for a grand total of 250 units of milk at 11:00.

In the example of Table 1, a calculation scenario may define a query that gets the total quantity of milk at the end of the day, so an aggregation of type LAST is required. To that end, the table is first sorted by "Date" and "Time." This groups the transaction by date, and then provides a sort of the entries in each day by time. Next, the LAST aggregation is applied on a keyfigure, such as "Amount," which has already been grouped by "Date."

Table 2 below shows an example result of the LAST aggregation on "Amount," which is followed by group by "Product."

TABLE 2

| Date | Product | Amount |
|---|---|---|
| Aug. 8, 2014 | Milk | 250 |
| Aug. 8, 2014 | Water | 100 |

The example of Table 2 shows a LAST aggregation wherein there is a single keyfigure, which is "Amount" in this example. However, the FIRST or LAST aggregation may need to operate over a plurality keyfigures, such as amount and unit price. When this is the case, a LAST aggregation on "Amount" group by "Product" may be performed and then a LAST aggregation on "Price" group by "Product" would be performed, which requires two scans on the database table (and, for example, two calculation nodes in the calculation scenario).

In some example embodiments, there is provided a FIRST aggregation command that can perform, in a single scan of the table, the FIRST aggregation within the same "group by" level on multiple keyfigures. In some example embodiments, there is provided a LAST aggregation command that can perform, in a single scan of the table, the LAST aggregation within the same "group by" level on multiple keyfigures. In some example embodiments, multiple keyfigures may be specified for the calculation engine operator with the aggregation type of FIRST or LAST. Moreover, the FIRST and LAST keyfigures may be mixed in one query operation. Additionally or alternatively, a list of "group by" attributes may be specified.

The following describes example embodiments with respect the FIRST aggregation or LAST aggregation over multiple keyfigures (which may avoid or reduce multiple scans of a database table).

In some example embodiments, the database table may be scanned completely and by some if not all of the "group by" attributes listed in the FIRST or LAST operator. Next, a hash value may be calculated over some if not all "group by" attribute values. For each row, the "group by" hash value is compared to the previous one. If the two "group by" hash values are not equal, this may be considered the start (or first row) a new group in the database table. For each of the group(s) and for each keyfigure within the group, the first or last value in the group is indicated as a FIRST result in a group or a LAST result in the group (depending on whether the aggregation type on a certain keyfigure is FIRST or LAST). After the table scan, the result can be assembled according to the marked values.

Table 3 below depicts an example of a database table. Table 3 includes date and time entries for products, such as milk, water, and the like. For each entry, the table lists the amount for a given product and unfulfilled (for example, open) orders for a product that needs to be fulfilled.

In the example of Table 3, a retailer may want a query (for planning purposes, for example) that determines the quantity of units for each product at the end of a given day. Moreover, the retailer may want the query to determine the quantity of open orders at the beginning of a given day (as those open orders have to be fulfilled the next business day). In this example, the "group by" is on "Date" and "Product". The keyfigure "Amount" has the aggregation type LAST and the keyfigure "Open CustomerOrders" has the aggregation type FIRST.

TABLE 3

| Date | Time | Product | Amount | Open Customer Orders |
|---|---|---|---|---|
| Aug. 8, 2014 | 08:15 | Milk | 100 | 50 |
| Aug. 8, 2014 | 08:30 | Water | 200 | 100 |
| Aug. 8, 2014 | 09:00 | Milk | 200 | 150 |
| Aug. 8, 2014 | 11:00 | Milk | 250 | 200 |
| Aug. 8, 2014 | 11:15 | Water | 100 | 0 |
| Aug. 9, 2014 | 08:30 | Milk | 200 | 75 |
| Aug. 9, 2014 | 09:00 | Water | 100 | 50 |
| Aug. 9, 2014 | 11:00 | Milk | 100 | 25 |

FIG. 1 depicts an example process 100 for performing, using a single scan of the table, a FIRST and/or LAST aggregation on multiple keyfigures within a group. The process 100 also refers to the example noted above with respect to Table 3. Although a query may include a FIRST and a LAST, the query may include a FIRST only or a LAST only as well. Alternatively or additionally, the query may include other quantities of FIRST aggregations and/or LAST aggregations. For example, a query may include two FIRST aggregations.

At 105, a query may be received. For example, a processor such as a calculation engine may receive a query. At 108, the query may be handled to determine whether the query include a FIRST aggregation and/or a LAST aggregation that can be optimized. If so, the optimization may proceed.

At 110, a processor, such as a calculation engine, may scan and thus read a database table. The scan may read the table completely or only the attributes required for the group by. Referring to the Table 3 example, the processor may read Table 3 entirely, although only the attributes needed for the group by may be read. In this example, needed attributes are "Date," "Product," "Amount," and "Open Customer-Orders."

At 120, the groups within the table may be detected. For example, a hash value may be calculated over all "group by" attribute values. Table 4 below depicts the hash calculation for the group by attributes of "Date." Next, for each row of the scanned table, the "group by" hash value in a given row is compared to the previous row's hash value. If the two "group by" hash values are not equal, this means that the given row is the start of a new group in the database table. A query may seek from Table 4 may ask for the LAST "amount" entry per "product" (water or milk) for each group (date and warehouse, for example) and for the FIRST "open customer order" entry per "product" (water or milk, for example) for each group (date and warehouse, for example).

TABLE 4

| Row Number | GROUP BY | Time | Product | Amount | Open Customer Orders |
|---|---|---|---|---|---|
| 1 | HASH1 | 08:15 | Milk | 100 | 50 |
| 2 | HASH1 | 08:30 | Water | 200 | 100 |
| 3 | HASH1 | 08:40 | Milk | 150 | 150 |
| 4 | HASH1 | 09:00 | Milk | 200 | 150 |
| 5 | HASH1 | 11:00 | Milk | 250 | 200 |
| 6 | HASH1 | 11:15 | Water | 100 | 0 |
| 7 | HASH2 | 08:30 | Milk | 200 | 75 |
| 8 | HASH2 | 09:00 | Water | 100 | 50 |
| 9 | HASH2 | 11:00 | Milk | 100 | 25 |

At 130, for each group and for each keyfigure, the first row value in a given group may be indicated (for example, marked, etc.) to show that this first row value is the first value. Additionally or alternatively, the last row value in a given group may be marked with an indication to show that this last row value is the first value.

Table 5 shows that row 1 is marked (with a hashtag, #, for example) as the first row for the first date group (labeled HASH1) and the group milk, while row 2 is marked as the first row for the first date group (labeled HASH1) and the group water. Table 5 shows that row 5 is marked (with an asterisk, *, for example) as the last row for the first date group (labeled HASH2) and the group milk.

Although the example at Table 5 described indicating the last or first with certain symbols, the indication may be performed in other ways as well. For example, for each attribute of interest (e.g., "Amount"), a one bit vector can be used wherein a 1 indicates that the value (in a given row) is needed and a 0 that the value (in a given row) is not needed to assemble the result. Alternatively or additionally, while scanning the table, the result table can be built directly, in which case all the values you marked with * or # are taken (with corresponding group by values from the specific row) and inserted into the return/output table.

TABLE 5

| Row Number | GROUP BY | Time | Product | Amount | Open Customer Orders |
|---|---|---|---|---|---|
| 1 | HASH1 | 08:15 | Milk | 100 | 50# |
| 2 | HASH1 | 08:30 | Water | 200 | 100# |
| 3 | HASH1 | 08:40 | Milk | 150 | 150 |
| 4 | HASH1 | 09:00 | Milk | 200 | 150 |
| 5 | HASH1 | 11:00 | Milk | 250* | 200 |
| 6 | HASH1 | 11:15 | Water | 100* | 0 |
| 7 | HASH2 | 08:30 | Milk | 200 | 75# |
| 8 | HASH2 | 09:00 | Water | 100* | 50# |
| 9 | HASH2 | 11:00 | Milk | 100* | 25 |

At 140, the FIRST aggregation by group and the LAST aggregation per group may be returned. For example, the result of the group by on "Date" and "Product" with the LAST aggregated over the keyfigure "Amount" while the FIRST keyfigure is aggregated "Open CustomerOrders." Table 6 depicts an example of what can be returned.

TABLE 6

| Date | Product | Amount | Open Custumer Orders |
|---|---|---|---|
| Aug. 8, 2014 | Milk | 250* | 50# |
| Aug. 8, 2014 | Water | 100* | 100# |

TABLE 6-continued

| Date | Product | Amount | Open Custumer Orders |
|---|---|---|---|
| Aug. 9, 2014 | Milk | 100* | 75# |
| Aug. 9, 2014 | Water | 100* | 50# |

The previous example shows that a single scan of a table may be used to perform a FIRST and/or LAST aggregation over multiple keyfigures in at least one group.

Although the FIRST command described above and/or the LAST command described above can be used in a variety of computing environments, operating systems, and databases, the following describes an example system including a calculation engine in which the FIRST and/or LAST commands described above can be used.

Figure 2:
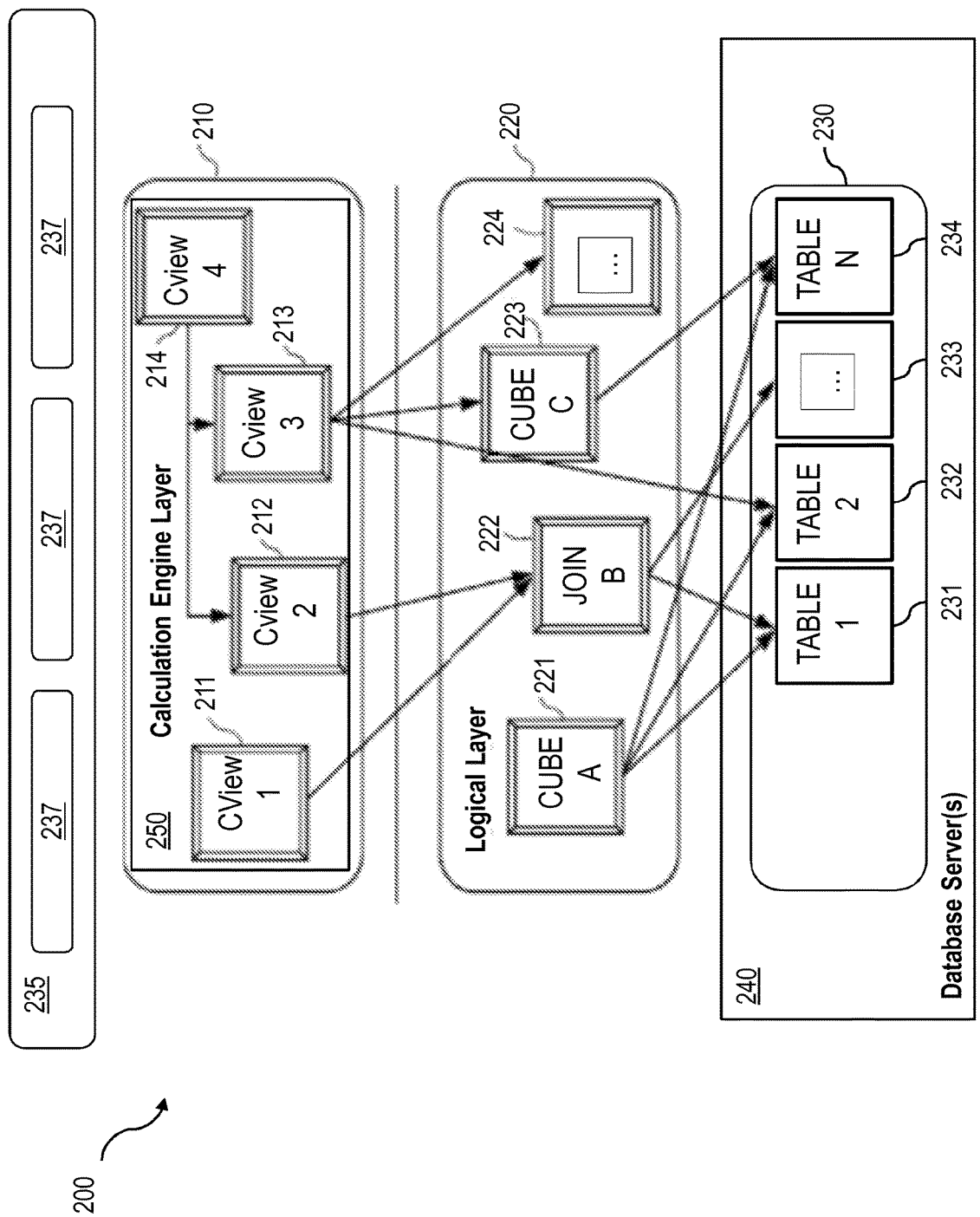
FIG. 2 depicts an example of a system including a calculation engine for performing the a FIRST or LAST aggregation.

FIG. 2 is a diagram that illustrates a computing architecture 210 including a database system that includes three layers: a calculation engine layer 210, a logical layer 220, and a physical table-pool 230. The description of FIG. 2 also refers to FIGS. 1 and 3.

One or more application servers 235 implementing database client applications 237 can access a database system 200.

Calculation scenarios can be executed by a calculation engine, which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of one or more physical tables (also called indexes or database tables) containing the data, which can be stored on one more database servers 240. Various tables 231-234 can be joined using logical models (also called metamodels) 221-224 defined by the logical layer 220 to form an index. For example, the tables 231-234 in a cube (e.g. an online analytical processing or "OLAP" index) can be assigned roles (e.g., fact or dimension tables) and joined to form a star schema. It is also possible to form join indexes (e.g., join index B 222 in FIG. 2 or a UNION at 224), which can act like database views in computing environments such as the Fast Search Infrastructure (FSI) available from SAP SE of Walldorf, Germany.

As stated above, a calculation scenario can include individual nodes (e.g. calculation nodes) 211-214, which in turn each define operations such as joining various physical or logical indexes and other calculation nodes (e.g., CView 4 is a join of CView 2 and CView 3).

In a calculation scenario, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 250. As noted above, this reuse may cause an increased size in the set of attributes and the corresponding calculation scenario, which makes parsing, persisting, and/or optimizing of the calculation scenarios more processor, memory, and/or power intensive. As such, the subject matter disclosed herein may provide a FIRST aggregation operation and/or a LAST aggregation operation that reduces the need for multiple table scans.

Every calculation scenario 250 can be uniquely identifiable by a name (e.g., the calculation scenario 250 can be a database object with a unique identifier, etc.). Accordingly, the calculation scenario 250 can be queried in a manner similar to a view in a SQL database. Thus, the query is forwarded to the calculation node 211-214 for the calculation scenario 250 that is marked as the corresponding default node. In addition, a query can be executed on a particular calculation node 211-214 (as specified in the query). Furthermore, nested calculation scenarios can be generated in which one calculation scenario 250 is used as source in another calculation scenario (e.g. via a calculation node 211-214 in this calculation scenario 250). Each calculation node 211-214 can have one or more output tables. One output table can be consumed by several calculation nodes 211-214.

In some example embodiments, a portion of the calculation scenario 250 may include a FIRST aggregation command that can perform, in a single scan of a database table, the FIRST aggregation, within the same "group by" level, on multiple keyfigures. Moreover, a portion of the calculation scenario 250 may include a LAST aggregation command that can perform, in a single scan of the table, the LAST aggregation, within the same "group by" level, on multiple keyfigures. In some example embodiments, a portion of the calculation scenario 250 may include a (or multiple) FIRST aggregation command and a (or multiple) LAST aggregation command that can perform, in a single scan of a database table, the FIRST aggregation(s), the LAST aggregation(s), within the same "group by" level, on multiple keyfigures.

Figure 3:
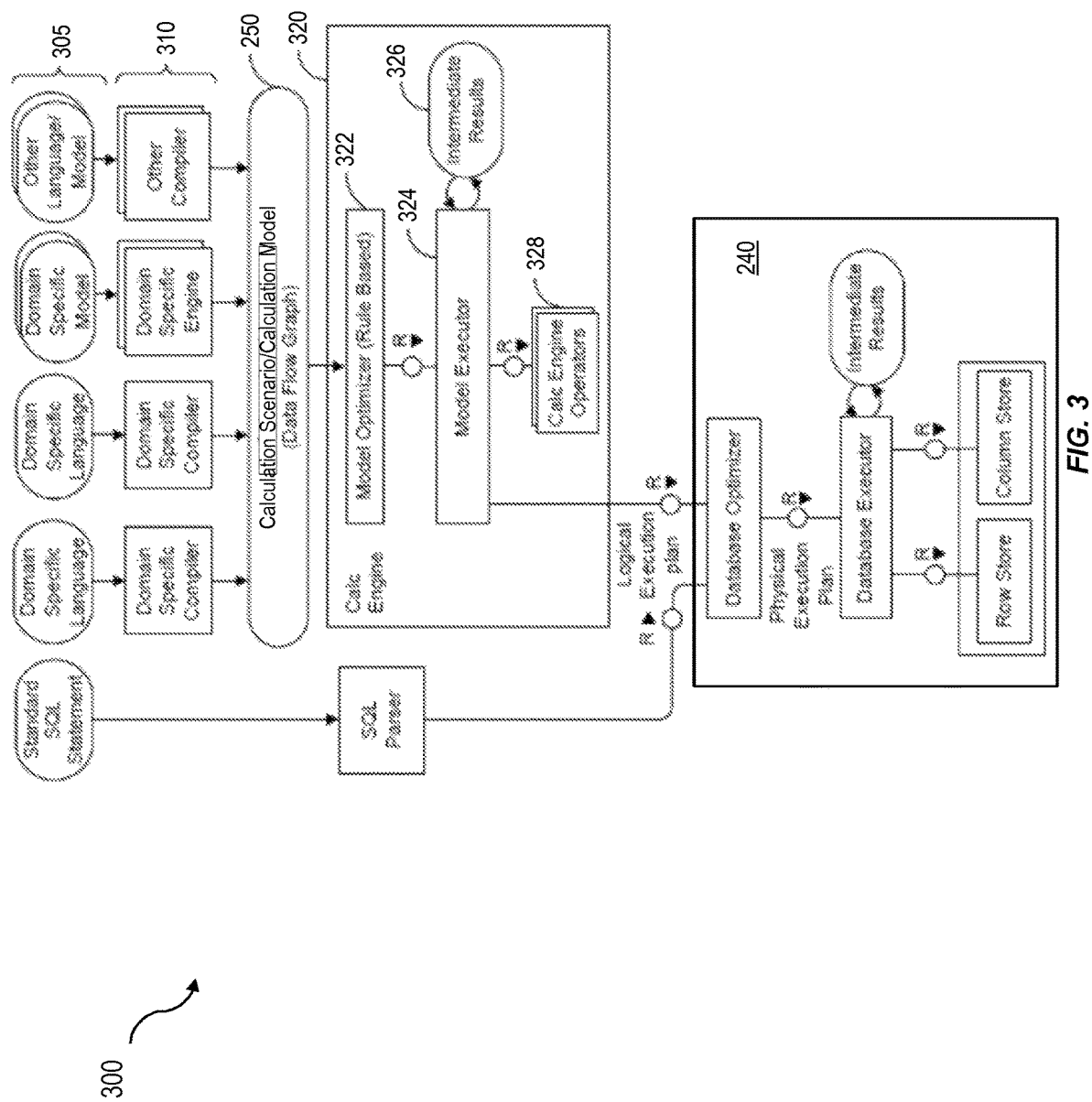
FIG. 3 depicts an example of a system including a calculation engine and providing request processing and execution control.

FIG. 3 is a diagram 300 illustrating a sample system for request processing and execution control. As shown in FIG. 3, artifacts 305 in different domain specific languages can be translated by their specific compilers 310 into a common representation called a "calculation scenario" 250 (which is also referred to in in FIG. 3 as a calculation model). To achieve enhanced performance, the models and programs written in these languages are executed inside the database server 240. This arrangement eliminates the need to transfer large amounts of data between the database server 240 and a client application 237, which can be executed by an application server 235. Once the different artifacts 305 are compiled into this calculation scenario 250, they can be processed and executed in the same manner. A calculation engine 320 executes the calculation scenarios 250.

A calculation scenario 250 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table-valued parameters (i.e., user-defined table types that are passed into a procedure or function and that provide an efficient way to pass multiple rows of data to a client application 237 at the application server 235). Inputs can be connected to tables or to the outputs of other nodes. A calculation scenario 250 can support a variety of node types such as (i) nodes for set operations such as projection, aggregation, join, union, minus, intersection, and/or other operations as well as (ii) SQL nodes that execute a SQL statement that is an attribute of the node. In addition, to enable parallel execution, a calculation scenario 250 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 250 can be defined as part of database metadata and invoked multiple times. A calculation scenario 250 can be created, for example, by a SQL statement "CREATE CALCULATION SCENARIO<NAME> USING <XML or JSON>". Once a calculation scenario 250 is created, it can be queried (e.g., "SELECT A, B, C FROM<scenario name>", etc.). In some cases, databases can have pre-defined calculation scenarios 250 (default, previously defined by users, etc.). Calculation scenarios 250 can be persisted in a repository (coupled to the database server 240) or in transient scenarios. Calculation scenarios 250 can also be kept in-memory.

Calculation scenarios 250 are more powerful than traditional SQL queries or SQL views for many reasons. One reason is the possibility to define parameterized calculation schemas that are specialized when the actual query is issued. Unlike a SQL view, a calculation scenario 250 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 250 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 250. This instantiated calculation scenario 250 is optimized for the actual query and does not contain attributes, nodes or data flows that are not needed for the specific invocation.

When the calculation engine 320 gets a request to execute a calculation scenario 250, it can first optimize the calculation scenario 250 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 250. The model executor 324 can invoke the required operators (using, for example, a calculation engine operator's module 328) and manage intermediate results. Most of the operators are executed directly in the calculation engine 320 (e.g., creating the union of several intermediate results). The remaining nodes of the calculation scenario 250 (not implemented in the calculation engine 320) can be transformed by the model executor 324 into a set of logical database execution plans. Multiple set operation nodes can be combined into one logical database execution plan if possible.

In some example embodiments, the calculation scenario 250 may include a FIRST aggregation command that can perform, in a single scan of a database table, the FIRST aggregation within the same "group by" level on multiple keyfigures. When this is the case, this FIRST aggregation may be performed in accordance with process 100.

In some example embodiments, calculation scenario 250 may include may include a LAST aggregation command that can perform, in a single scan of the table, the LAST aggregation within the same "group by" level on multiple keyfigures. Moreover, this LAST aggregation may be performed in accordance with process 100.

Referring again to FIG. 1 and FIGS. 2 and 3, a query. For example, the calculation engine layer 210 may receive a query from a client application 237. The query may correspond to the Table 3 query example noted above. In the example above, the query determines the quantity of units for each product at the end of a given day and the quantity of open orders at the beginning of a given day. As noted above, the "group by" is on "Date" and "Product"; the keyfigure "Amount" has the aggregation type LAST and the keyfigure "Open CustomerOrders" has the aggregation type FIRST. The calculation engine layer 210 may detect an opportunity to optimize this query by performing process 100 and thus reduce the number of table scans to a single scan, while still providing the same FIRST and LAST aggregation result. Moreover, multiple FIRST and LAST keyfigures can be included in one single scan within the same group by; FIRST and LAST keyfigures can be mixed.

The calculation scenarios 250 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 250 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

A calculation scenario 250 as described herein can include a type of node referred to herein as a semantic node (or sometimes semantic root node). A database modeler can flag the root node (output) in a graphical calculation view to which the queries of the database applications directed as semantic node. This arrangement allows the calculation engine 320 to easily identify those queries and to thereby provide a proper handling of the query in all cases.

Without in any way limiting the scope, interpretation, or application of the claims appearing herein, a technical effect of one or more of the example embodiments disclosed herein may include increasing throughput of threads, maintaining power consumption (and as a result cooling demand) of a CPU below a certain threshold (which is according to the sizing of the power unit and cooling capacity of the computer system). Without in any way limiting the scope, interpretation, or application of the claims appearing herein, a technical effect of one or more of the example embodiments disclosed herein may include reducing the runtime of a series of tasks independently of the design of the task through the increased efficiency of accessing the priority queue of a task scheduler, by reducing lock contention on the priority queue, while decreasing the looseness that can be introduced by lock contention reducing algorithm These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed:

1. A method comprising:
   receiving, by a calculation engine, a query to optimize table scanning when the query includes a first aggregation query instruction over at least a first group and a first key figure column and a last aggregation query instruction over at least a second group and a second key figure column, the calculation engine interfacing at least one database including a table;
   detecting, by the calculation engine, that the query includes the first aggregation query instruction and the last aggregation query instruction, wherein the first aggregation query instruction is configured to return, as part of a result set of the query, a first key figure value in the first group, and wherein the last aggregation query instruction is configured to return, as part of the result set of the query, a last key figure value in the second group;
   in response to the detecting that the received query includes the first aggregation query instruction and the last aggregation query instruction, optimizing, by the calculation engine, the received query, wherein the optimizing further comprises initiating execution of the received query by at least:
      performing, by the calculation engine, a single read of the table,
      replacing, in the single read table, attribute values of the first group and the second group with corresponding first hash values for the first group and corresponding second hash values for the second group;
      detecting, from the single read table, the first group and the second group based on a change in the hash values, and
      indicating, in the detected first group and the second group, the first key figure value corresponding to the first aggregation query instruction and the last key figure value corresponding to the last aggregation query instruction; and
   returning the result set to the query, the result set including the indicated first key figure value and the indicated last key figure value, without the calculation engine performing a second read of the table.

2. The method of claim 1, wherein the detecting further comprises:
   detecting, from the single table read, the at least one group based on the hash value.

3. The method of claim 1, wherein the query includes a plurality of first aggregation query instructions and a plurality of last aggregation query instructions over a plurality of groups and a plurality key figures.

4. The method of claim 1, wherein the database includes a database optimizer separate from an optimizer of the calculation engine interfacing the database.

5. The method of claim 1, wherein the first group and the second group are each sorted.

6. A system comprising:
   at least one processor and at least one memory including code which when executed causes operations comprising:
      receiving, by a calculation engine, a query to optimize table scanning when the query includes a first aggregation query instruction over at least a first group and a first key figure column and a last aggregation query instruction over at least a second group and a second key figure column, the calculation engine interfacing at least one database including a table;
      detecting, by the calculation engine, that the query includes the first aggregation query instruction and the last aggregation query instruction, wherein the first aggregation query instruction is configured to return, as part of a result set of the query, a first key figure value in the first group, and wherein the last aggregation query instruction is configured to return, as part of the result set of the query, a last key figure value in the second group;
      in response to the detecting that the received query includes the first aggregation query instruction and the last aggregation query instruction, optimizing, by the calculation engine, the received query, wherein the optimizing further comprises initiating execution of the received query by at least:
         performing, by the calculation engine, a single read of the table,
         replacing, in the single read table, attribute values of the first group and the second group with corresponding first hash values for the first group and corresponding second hash values for the second group;
         detecting, from the single read table, the first group and the second group based on a change in the hash values, and
         indicating, in the detected first group and the second group, the first key figure value corresponding to the first aggregation query instruction and the last key figure value corresponding to the last aggregation query instruction; and
      returning the result set to the query, the result set including the indicated first key figure value and the indicated last key figure value, without the calculation engine performing a second read of the table.

7. The system of claim 6, wherein the detecting further comprises:
   detecting, from the single table read, the at least one group based on the hash value.

8. The system of claim 6, wherein the query includes a plurality of first aggregation query instructions and a plurality of last aggregation query instructions over a plurality of groups and a plurality keyfigures.

9. A non-transitory computer-readable storage medium including program code which when executed causes operations comprising:
   receiving, by a calculation engine, a query to optimize table scanning when the query includes a first aggregation query instruction over at least a first group and a first key figure column and a last aggregation query instruction over at least a second group and a second key figure column, the calculation engine interfacing at least one database including a table;
   detecting, by the calculation engine, that the query includes the first aggregation query instruction and the last aggregation query instruction, wherein the first aggregation query instruction is configured to return, as part of a result set of the query, a first key figure value in the first group, and wherein the last aggregation query instruction is configured to return, as part of the result set of the query, a last key figure value in the second group;
   in response to the detecting that the received query includes the first aggregation query instruction and the last aggregation query instruction, optimizing, by the calculation engine, the received query, wherein the optimizing further comprises initiating execution of the received query by at least:

performing, by the calculation engine, a single read of the table, replacing, in the single read table, attribute values of the first group and the second group with corresponding first hash values for the first group and corresponding second hash values for the second group;

detecting, from the single read table, the first group and the second group based on a change in the hash values, and indicating, in the detected first group and the second group, the first key figure value corresponding to the first aggregation query instruction and the last key figure value corresponding to the last aggregation query instruction; and returning the result set to the query, the result set including the indicated first key figure value and the indicated last key figure value, without the calculation engine performing a second read of the table.

\* \* \* \* \*